United States Patent Office 3,193,345
Patented July 6, 1965

3,193,345
METHOD OF RECOVERING MONO-ACIDIC ALUMINUM SULFATE HYDRATE
Adam J. Marsh, Niagara Falls, N.Y., assignor, by mesne assignments, to The North American Coal Corporation, a corporation of Ohio
No Drawing. Filed Oct. 9, 1961, Ser. No. 143,598
6 Claims. (Cl. 23—123)

This invention relates to hydrometallurgy, in general, and has for a principal object the provision of an improved process for the production and recovery of aluminum sulfate from alumina-bearing materials such as ores, clays, shales, slags, concentrates and waste residues. More particularly, the invention contemplates the provision of an improved and extremely simplified acid process for the extraction and recovery of mono-acidic aluminum sulfate hydrate from alumina-bearing materials of the general class described including, for example, normal bauxite ores; high-silica, high-iron bauxite ores; alumina-bearing clays; low-grade alumina-containing titaniferous iron ores; red mud residues from the Bayer alumina process; waste alumina-bearing residues and overburdens from coal mining and cleaning operations; alumina-containing slags; and natural silicates of aluminum such as sillimanite and andalusite ($Al_2SiO_5$), kyanite [$(AlO)_2 \cdot SiO_3$], and fibrolite ($Al_2O_3 \cdot SiO_2$), among others; or hydrous aluminum oxides such as diaspore $$(Al_2O_3 \cdot H_2O)$$

or alums of the type of alunite $$[K_2SO_4 \cdot Al_2(SO_4)_3 \cdot 4Al(OH_3)]$$

among others.

Prominant among the many prior proposals aimed at utilizing certain of the above-enumerated lower-grade raw materials for alumina production are those processes which involve the intermediate production of some form of aluminum sulfate or alum. While these materials all require further processing to derive the high-purity alumina required as charge to the Hall aluminum reduction process, it must be noted that the sulfate, per se, finds many valuable applications in industry. Processes of this type generaly employ sulfuric acid to digest the raw alumina-bearing material (either with or without various pre-treatment operations), thereby separating the metallic values in sulfated form from the insoluble silica and gangue constituents, which are discarded. In these processes, the alumina-bearing acid solution, or liquor, is allowed to cool to a temperature where, variously, acid salts, alums or potash alums precipitate therefrom, and the precipitate is separated from the spent liquor and further processed to produce aluminum sulfate. It is essential to effect the removal of contained iron from both the solution and the crystals, and several successive precipitations, crystallizations or chemical treatments are generally pursued before the product is brought to the required degree of purity.

As an example of the foregoing type of operation, the process described in U.S. Patent Number 2,476,979, issued July 26, 1949, to E. C. Hoeman, is believed to be typical. Thus, an alumina-bearing clay or other silicate of aluminum is digested in a large excess (4 or 5 times the stoichiometric amount) of a strong solution of sulfuric acid having a concentration of approximately 48° Bé., the digestion being carried out at a temperature of 80° C. or higher. The residue is washed with a sulfuric acid solution of equivalent concentration (48° Bé), and then washed with water, the washings being added to the feed acid after several cycles, and the washed residue being discarded. Ultimate crystallization of aluminum sulfate from the liquor, along with impurities such as iron, is effected by cooling the liquor to a temperature between 25° C. and 35° C., followed by separation and recovery of the same by filtration. In the patented Hoeman process, the aluminum sulfate is precipitated and recovered in the form of crystalline acidic aluminum sulfate of approximate composition corresponding to $Al_2(SO_4)_3 \cdot YH_2SO_4 \cdot XH_2O$, where Y and X are 3 and 7, respectively. The latter product, essentially useless in this highly acidic form, is then subjected to successive multistage washings with concentrated sulfuric acid to remove impurities and convert the salt to the less acidic form of aluminum sulfate having the approximate compositions, $Al_2(SO_4)_3 \cdot H_2SO_4 \cdot 3H_2O$. The wash acid also contains $SO_2$ functioning to reduce ferric sulfate to the ferrous form. It is only at this late stage that iron is finally removed. Thereafter, the washed acid sulfate must be further treated at a temperature within the range of from 140° C. to 180° C. to convert it into substantially normal aluminum sulfate [$Al_2(SO_4)_3$] through elimination of residual sulfuric acid. The wash acid must be purified by evaporating to a concentration of 55° or 60° Bé., where the contained impurity sulfates become insoluble and are separated by filtration; the purified acid being recycled to the digestion stage.

The principal disadvantage of the foregoing process, as with many others, is that the product of the initial crystallization still contains most of the impurities and is not recovered in the form of the normal sulfate, but rather, a sulfate which requires substantial after-treatment, entailing both large acid losses and additional equipment.

A very significant improvement over the Hoeman process has been described and claimed in copending U.S. patent application of Marvin J. Udy, Serial No. 125,620 filed July 15, 1961, entitled "Hydrometallurgical Process," and now abandoned. The major contributions of Udy are a unique acid-leaching technique whereby substantially all of the iron and other sulfate-forming impurities are prevented from entering the leach liquor, being discarded with the silica residue, coupled with a crystallization mechanism which functions directly to yield the normal hydrated aluminum sulfate salt of approximate composition $Al_2(SO_4)_3 \cdot 16$–$18H_2O$. By thus providing a leach liquor essentially free of all major impurities, Udy is able to avoid all of the recrystallizations and multistage washings which have plagued the economies of all previous processes of the same general type. Specifically, Udy teaches that the leach should be carried out with acid of approximately 45° Bé. strength at temperatures up to the boiling point of the acid. With sufficiently comminuted raw materials, a leach time of 1½ hours is said to be sufficient. The leach produces a liquor concentrated with respect to the normal aluminum sulfate hydrate. After leaching, the liquor is separated from the impurity-laden silica residue by filtering, concentrations of the solution components are checked and adjusted and the normal salt is crystallized directly from the solution. Simple neutralization of mechanically entrained acid with alumina trihydrate or soluble alumina (by melting the crystals in their own water of crystallization) completes the rather simple processing technique.

As noted above, the process of Hoeman suffers from the initial production of a strongly acid salt, which can only be converted to a less acidic or normal salt by expensive multistage washing techniques. The Udy process, while producing the more desirable normal hydrated (16–18$H_2O$) salt directly, suffers from certain other disadvantages, in that, proper crystallization conditions necessitate adjustment of the concentration of the acid and/or aluminum sulfate to an extent which increases the total volume of the liquor which must be carried in the system. This, of course, increases the capital cost of the processing equipment as well as continued operating costs for the process. Also, while the normal hydrated salt has substantial advantages over the highly acidic salt of Hoeman, the dehydration of 16–18 moles of water, where this becomes necessary or desirable, represents additional processing time and capital outlay.

It is the principal object of my invention to avoid the above-mentioned disadvantages of the Udy process, while simultaneously avoiding the disadvantages inherent in Hoeman's recovery of a highly acidic salt. In particular, I have found that it is possible to produce and recover directly from the leach solution a mono-acidic salt of approximate composition $Al_2(SO_4)_3 \cdot H_2SO_4 \cdot 12H_2O$ under conditions controlled to avoid the large volume of pregnant liquor necessary for proper operation of the Udy process. As will be readily apparent, such a salt is substantially easier to treat than the highly acidic salt produced by Hoeman, whereas it is also easier to dehydrate than the specific normal salt produced by Udy.

Thus, I have found that the mono-acidic salt presents no difficulties in a subsequent thermal decomposition step, for example, which effects its conversion to aluminum oxide, since in this reaction the principal by-products are mixed sulfur oxide gases which are recovered as sulfuric acid. In any event, the salt may be neutralized by following the Udy practice of melting the crystals in their own water of crystallization and adding alumina trihydrate. Furthermore, the necessary dehydration preliminary to such a thermal decomposition operation is substantially easier to perform in view of the reduced water of crystallization present in my end-product as compared with Udy's.

While I prefer to follow the leaching practice disclosed by Udy to obtain the pregnant, iron-free liquor, it is necessary in accordance with the principal objective of my invention after the leaching operation to proportion the various ingredients of the system in a carefully controlled manner.

Broadly speaking, I have found that the mono-acidic salt can be crystallized to the exclusion of other salt forms when the pregnant liquor (at 25° C.) contains between 15 and 58 percent $H_2SO_4$ and between 33 and 50 percent $H_2O$. While these ranges are valid for aluminum sulfate concentrations ranging up to 52 percent, as a practical matter its concentration seldom goes above 25 percent. It is to be noted in this connection that whereas the aforementioned ranges serve to establish the necessary parameters for the formulation of solutions of proper concentration, they do not provide a relation between the solution components which is helpful to insure the crystallization of the desirable monoacidic salt in all cases. In particular, I have found that for any given concentration of aluminum sulfate, there is a range of concentrations of sulfuric acid which are allowable and from which the desired salt will be crystallized. Conversely, of course, for any given acid concentration (within the above-mentioned limits) there is a range of aluminum sulfate concentrations which are allowable. These relations may conveniently be expressed as follows, for a solution at 25° C.:

$$[H_2SO_4]_{max} = 58.85 - 0.844[Al_2(SO_4)_3] \quad (1)$$
$$[H_2SO_4]_{min} = 50 - 0.673[Al_2(SO_4)_3] \quad (2)$$

By substituting the measured concentration of aluminum sulfate, as percent, in both of the above equations, the allowable range of sulfuric acid concentration will be determined, also in percent. For example, if the pregnant liquor contains 15 percent $Al_2(SO_4)_3$, solution of Equations 1 and 2 will establish that the allowable range of acid concentration is from 39.9 to 46.2 percent by weight. As stated hereinbefore, the above equations have been found to be valid over a broad range of values—alumina concentrations up to 52 percent and acid concentrations between about 15–58 percent. These limits of concentration need be of no concern to the operator, however, as they are inherent in the above equations, there being no positive solutions to the equations beyond these ranges. By transposing the equations, a range of aluminum sulfate concentration for any given acid concentration will result.

It is to be noted that the allowable concentrations under Equations 1 and 2 are mutually exclusive of the teachings of either Hoeman or Udy, as might well be expected from the form of salts claimed to be produced by these contemporaries. For example, Udy teaches that for a concentration of aluminum sulfate of approximately 20 percent, the maximum acid concentration should be established and maintained at about 30 percent. By contrast, Equations 1 and 2 indicate that under similar conditions, the acid concentration may range from between 36.5–42 percent, if the mono-acidic salt of aluminum sulfate hydrate is to be produced.

As an alternative to strict adherence to the teachings of Udy in the leaching stage of the process of the invention, I have found that substantially the same results may be obtained by calculating, in advance of leaching, the necessary proportions of reactants—alumina-bearing material and acid strength and volume—so that the leach liquor will contain the aforementioned ranges of reactants. In particular, I have found that by following such a procedure, it is entirely possible to avoid any substantial contamination of the leach liquor with iron or other sulfate-forming impurities, in the manner of Udy, and without further adjustment of concentration, to effect the direct production of a leach liquor from which the mono-acidic salt can be crystallized. In carrying out these process measures, it is necessary to make allowances for the inevitable acid losses attributable to the silica residue. The efficiency of the leach in terms of alumina extraction must also be taken into account; while both of these adjustments are small, it must be remembered that the leach liquor must necessarily be of such concentration as to fall into the previously defined, rather narrow limits in order for the mono-acidic salt to be formed directly upon crystallization. To insure production of the proper salt, concentration of acid and sulfate should be checked prior to crystallization.

It is believed that a more complete understanding of my invention may be had by reference to the following specific example illustrating the application of the foregoing principles and procedures to the direct production of mono-acidic aluminum sulfate hydrate from typical starting materials of the general class defined hereinabove:

EXAMPLE

The material treated consisted of an alumina-bearing coal mine waste or overburden taken directly from the mine in the form of chunks averaging about 28 inches by 8 inches. This material was fed to a primary jaw crusher, a secondary cone crusher, a hammer mill, and further processed until it was 100%—16 mesh and 50%—100 mesh. For the test run, 1000 pounds of this crushed material of the following analysis were used:

| | Percent |
|---|---|
| $Al_2O_3$ | 22.91 |
| $SiO_2$ | 54.24 |
| C | 4.96 |
| S | 2.96 |
| Alkali ($Na_2O$) | 2.83 |
| $Fe_2O_3$ | 3.86 |
| $TiO_2$ | 1.04 |
| MgO | 0.78 |
| CaO | 0.70 |
| Moisture | 0.87 |

The raw material was fed into the first leach tank together with 867 pounds of new concentrated (92%) sulfuric acid and 2,434 pounds of recycled spent liquor from previous operations. The resulting leach liquor contained 64.3 percent $H_2SO_4$ (51° Bé.), and its weight was 3.3 times the weight of the solid material. Leaching was carried out at approximately 145° C. for slightly more than 1½ hours. No sulfur dioxide or other reductant was used with this material. During the leaching cycle, 279 pounds of water was evaporated, leaving, at the end of the cycle, 4,022 pounds of leach slurry. This was filtered and washed, 1118 pounds of wash water being added at this time, resulting in 1460 pounds of silica residue and 3,680 pounds of pregnant liquor of the following analyses:

*Silica residues*

| Constituent | | Percent |
|---|---|---|
| Inerts (including Fe) | 730 | 50.0 |
| $H_2SO_4$ | 29 | 2.0 |
| $H_2O$ | 686 | 47.0 |
| $Al_2(SO_4)_3$ | 15 | 1.0 |
| | 1,460 | 100.0 |

*Pregnant liquor*

| Constituent | | Percent |
|---|---|---|
| $H_2SO_4$ | 1,461 | 39.7 |
| $Al_2(SO_4)_3$ | 754 | 20.5 |
| $H_2O$ | 1,465 | 39.8 |
| | 3,680 | 100.0 |

The pregnant liquor was crystallized by cooling and 3,680 pounds of crystallized slurry were recovered. The slurry was centrifuged and washed with 312 pounds of 46 percent sulfuric acid and the spent liquor was then recycled. The product, amounting to 1558 pounds analyzed as follows:

| Constituent | | Percent |
|---|---|---|
| $Al_2(SO_4)_3 \cdot H_2SO_4 \cdot 12H_2O$ | 1,402 | 90.0 |
| $H_2SO_4$ | 72 | 4.6 |
| $H_2O$ | 84 | 5.4 |
| | 1,558 | 100.0 |

The spent liquor, contining 34 pounds of aluminum sulfate and about 0.4% of $Fe_2O_3$ was recycled to the leaching operation. The iron content of the spent liquor did not build up during subsequent cycles.

The 1402 pounds of hydrated mono-acidic, salt represent a recovery of 95.2% of the available aluminum in the original ore. It is to be noted that Equations 1 and 2 define the allowable concentration range of $H_2SO_4$ under the above conditions as 36.2% to 41.5%.

Having thus described the subject matter of my invention, what is desired to secure by Letters Patent is as follows:

1. In a process for the crystallization of aluminum sulfate salts from acidified aluminum-bearing leach liquors, the improvements which comprise, adjusting the concentration of said liquors such that for a given concentration of aluminum sulfate contained therein, expressed as percent by weight at twenty-five degrees centigrade (25° C.), the concentration of sulfuric acid similarly expressed falls within the limits defined by the equations:

$$[H_2SO_4]_{max.} = 58.85 - 0.844[Al_2(SO_4)_3]$$

and $$[H_2SO_4]_{min.} = 50 - 0.673[Al_2(SO_4)_3]$$

and crystallizing from the resulting solution mono-acidic aluminum sulfate of the approximate composition:

$$Al_2(SO_4)_3 \cdot H_2SO_4 \cdot 12H_2O$$

2. Process for the sulfuric acid extraction of alumina-bearing materials containing iron, other sulfate-forming impurities, and silica for the production and recovery of mono-asidic aluminum sulfate, that comprises avoiding any appreciable solubilization of said iron and other sulfate-forming impurities by effecting said sulfuric acid extraction under conditions controlled to provide for the production of a leach liquor concentrated with respect to salts of aluminum sulfate and essentially free of said iron and other sulfate-forming impurities, separating said liquor from said iron and other impurities and said silica by direct filtration, adjusting the concentration of said liquor such that for a given concentration of aluminum sulfate contained therein, expressed as percent by weight at twenty-five degrees centigrade (25° C.), the concentration of sulfuric acid similarly expressed falls within the limits defined by the equations:

$$[H_2SO_4]_{max.} = 58.85 - 0.844[Al_2(SO_4)_3]$$

and $$[H_2SO_4]_{min.} = 50 - 0.673[Al_2(SO_4)_3]$$

and crystallizing from the resulting solution a mono-acidic aluminum sulfate of the approximate composition: $Al_2(SO_4)_3 \cdot H_2SO_4 \cdot 12H_2O$.

3. Process for the sulfuric acid extraction of alumina-bearing materials containing iron, other sulfate-forming impurities and silica for the production and recovery of mono-acidic aluminum sulfate hydrate, that comprises proportioning said alumina-bearing material and said acid in such a manner that, for a given concentration of aluminum sulfate contained in the resulting leach liquor, expressed as percent by weight at twenty-five degree centigrade (25° C.), the concentration of sulfuric acid similarly expressed will be within the limits defined by the equations:

$$[H_2SO_4]_{max.} = 58.85 - 0.844[Al_2(SO_4)_3]$$

and $$[H_2SO_4]_{min.} = 50 - 0.673[Al_2(SO_4)_3]$$

extracting said alumina values under conditions controlled as aforesaid to provide a leach liquor substantially free of said iron and other sulfate-forming impurities, thereafter separating said liquor from said iron and other impurities and said silica by direct filtration, and crystallizing therefrom mono-acidic aluminum sulfate hydrate of the approximate composition: $Al_2(SO_4)_3 \cdot H_2SO_4 \cdot 12H_2O$.

4. In a process for the crystallization of aluminum sulfate salts from acidified aluminum-bearing leach liquors, the improvements which comprise adjusting the concentration of said liquors such that for a given concentration of sulfuric acid contained therein, expressed as percent by weight at twenty-five degrees centigrade (25° C.), the concentration of aluminum sulfate similarly expressed is within the limits defined by the equations:

$$[Al_2(SO_4)_3]_{max.} = \frac{58.85 - [H_2SO_4]}{0.844}$$

and $$[Al_2(SO_4)_3]_{min.} = \frac{50 - [H_2SO_4]}{0.673}$$

and crystallizing from the resulting solution mono-acidic aluminum sulfate of the approximate composition:

$$Al_2(SO_4)_3 \cdot H_2SO_4 \cdot 12H_2O$$

5. Process for the sulfuric acid extraction of alumina-bearing materials containing iron, other sulfate-forming impurities and silica for the production and recovery of mono-acidic aluminum sulfate hydrate, that comprises proportioning said alumina-bearing material and said acid such that, for a given concentration of sulfuric acid contained in the resulting leach liquor, expressed as percent by weight at twenty-five degrees centigrade (25° C.), the concentration of aluminum sulfate similarly expressed will be within the limits defined by the equations:

$$[Al_2(SO_4)_3]_{max.} = \frac{58.85 - [H_2SO_4]}{0.844}$$

and $$[Al_2(SO_4)_3]_{min.} = \frac{50 - [H_2SO_4]}{0.673}$$

extracting said alumina values under conditions controlled to provide a leach liquor substantially free of said iron and other sulfate-forming impurities, thereafter separating said liquor from said iron and other impurities and said silica by direct filtration, crystallizing therefrom mono-acidic aluminum sulfate hydrate of the approximate composition: $Al_2(SO_4)_3 \cdot H_2SO_4 \cdot 12H_2O$, and neutralizing the salt thus obtained by remelting same in its own water of crystallization and adding thereto a controlled amount of alumina trihydrate.

6. In the recovery of mono-acidic aluminum sulfate hydrate of the approximate composition $$Al_2(SO_4)_3 \cdot H_2SO_4 \cdot 12H_2O$$

from an acid aqueous solution of an aluminum sulfate, the steps which comprise, adjusting said solution to one having, when expressed in parts by weight at approximately 25° C. between 15 and 58% $H_2SO_4$ and between 33 and 50% $H_2O$, the maximum and minimum $H_2SO_4$ concentrations for known concentrations of $Al_2(SO_4)_3$ being determined from the following equations:

$$[H_2SO_4]_{max.} = 58.85 - 0.844[Al_2(SO_4)_3]$$

$$[H_2SO_4]_{min.} = 50 - 0.673[Al_2(SO_4)_3]$$

and cooling said solution from an elevated temperature to a lower temperature to effect crystallization directly of mono-acidic aluminum sulfate hydrate of said approximate composition.

References Cited in the file of this patent
UNITED STATES PATENTS

| | | |
|---|---|---|
| 1,222,960 | McKee | Apr. 17, 1917 |
| 1,962,498 | Frost | June 12, 1934 |
| 2,273,930 | Brown | Feb. 24, 1942 |